United States Patent
Ng-Thow-Hing et al.

(10) Patent No.: US 9,378,644 B2
(45) Date of Patent: Jun. 28, 2016

(54) SYSTEM AND METHOD FOR WARNING A DRIVER OF A POTENTIAL REAR END COLLISION

(71) Applicant: Honda Motor Co., Ltd., Tokyo (JP)

(72) Inventors: Victor Ng-Thow-Hing, Sunnyvale, CA (US); Karlin Bark, Menlo Park, CA (US); Cuong Tran, Santa Clara, CA (US); Timothy Michael Stutts, Austin, TX (US)

(73) Assignee: Honda Motor Co., Ltd., Tokyo (JP)

( * ) Notice: Subject to any disclaimer, the term of this patent is extended or adjusted under 35 U.S.C. 154(b) by 76 days.

(21) Appl. No.: 14/506,523

(22) Filed: Oct. 3, 2014

(65) Prior Publication Data

US 2015/0022426 A1    Jan. 22, 2015

Related U.S. Application Data

(63) Continuation-in-part of application No. 14/465,049, filed on Aug. 21, 2014, which is a continuation-in-part of application No. 13/832,918, filed on Mar. 15, 2013, now Pat. No. 9,164,281, and a continuation-in-part of application No. 14/460,478, filed on Aug. 15, 2014, and a continuation-in-part of application No. 14/463,618, filed on Aug. 19, 2014.

(51) Int. Cl.
*B60Q 1/44* (2006.01)
*G08G 1/16* (2006.01)
(Continued)

(52) U.S. Cl.
CPC *G08G 1/166* (2013.01); *B60Q 1/00* (2013.01); *B60Q 1/444* (2013.01); *G02B 27/01* (2013.01); *G06T 19/00* (2013.01); *G01C 1/00* (2013.01); *G02B 1/00* (2013.01); *G02B 2027/014* (2013.01); *G02B 2027/0187* (2013.01)

(58) Field of Classification Search
CPC .................................... G02B 1/00; G01C 1/00
See application file for complete search history.

(56) References Cited

U.S. PATENT DOCUMENTS 5,051,735 A    9/1991    Furukawa
5,115,398 A    5/1992    De Jong
(Continued)

FOREIGN PATENT DOCUMENTS

DE    10130046    1/2003
DE    10131720    1/2003
(Continued)

OTHER PUBLICATIONS

Search Report of DE Application No. 102014219575.6 dated Dec. 16, 2015, 12 pages.
(Continued)

*Primary Examiner* — Shirley Lu
(74) *Attorney, Agent, or Firm* — Rankin, Hill & Clark LLP (57) ABSTRACT

A system for indicating braking intensity to a main vehicle has an observational device monitoring positional and speed data of at least one vehicle proximate the main vehicle. A control unit is coupled to the observational device. The control unit processes the positional and speed data monitored by the observational device and generates graphical representations of the at least one vehicle proximate the main vehicle and graphical representations of a braking intensity level of the at least one vehicle proximate the main vehicle.

10 Claims, 5 Drawing Sheets

(51) Int. Cl.
*G02B 27/01* (2006.01)
*B60Q 1/00* (2006.01)
*G06T 19/00* (2011.01)
*G01C 1/00* (2006.01)
*G02B 1/00* (2006.01)

(56) References Cited

U.S. PATENT DOCUMENTS

| | | | |
|---|---|---|---|
| 5,368,309 A | 11/1994 | Monroe et al. | |
| 5,440,428 A | 8/1995 | Hegg et al. | |
| 5,519,536 A | 5/1996 | Hoehn | |
| 6,222,583 B1 | 4/2001 | Matsumura et al. | |
| 6,285,317 B1 | 9/2001 | Ong | |
| 6,574,555 B2 | 6/2003 | Mochizuki et al. | |
| 6,708,087 B2 | 3/2004 | Matsumoto | |
| 6,735,517 B2 | 5/2004 | Engelsberg et al. | |
| 6,774,772 B2 | 8/2004 | Hahn | |
| 6,947,064 B1 | 9/2005 | Hahn et al. | |
| 7,124,027 B1 | 10/2006 | Ernst, Jr. | |
| 7,190,260 B2 * | 3/2007 | Rast | G08G 1/162 340/467 |
| 7,216,035 B2 | 5/2007 | Hortner et al. | |
| 7,379,813 B2 | 5/2008 | Kubota et al. | |
| 7,519,471 B2 | 4/2009 | Shibata et al. | |
| 7,565,230 B2 | 7/2009 | Gardner et al. | |
| 7,627,419 B2 | 12/2009 | Yoshida | |
| 7,647,170 B2 | 1/2010 | Sawaki et al. | |
| 7,783,422 B2 | 8/2010 | Tanaka | |
| 7,815,313 B2 | 10/2010 | Ito et al. | |
| 7,920,102 B2 | 4/2011 | Breed | |
| 8,135,536 B2 | 3/2012 | Matsunaga et al. | |
| 8,208,208 B2 | 6/2012 | Schwab | |
| 8,305,444 B2 | 11/2012 | Hada | |
| 8,352,181 B2 | 1/2013 | Hagiwara | |
| 8,358,224 B2 | 1/2013 | Seder et al. | |
| 8,406,990 B2 | 3/2013 | Barkowski et al. | |
| 8,411,245 B2 | 4/2013 | Lee et al. | |
| 8,620,575 B2 | 12/2013 | Vogt et al. | |
| 8,633,810 B2 | 1/2014 | Luo et al. | |
| 8,633,979 B2 | 1/2014 | Szczerba et al. | |
| 8,660,735 B2 | 2/2014 | Tengler et al. | |
| 8,686,872 B2 | 4/2014 | Szczerba et al. | |
| 8,686,922 B2 | 4/2014 | Breed | |
| 8,725,342 B2 | 5/2014 | Ferguson et al. | |
| 2004/0193347 A1 | 9/2004 | Harumoto et al. | |
| 2005/0004723 A1 | 1/2005 | Duggan et al. | |
| 2005/0071082 A1 | 3/2005 | Ohmura et al. | |
| 2005/0195383 A1 | 9/2005 | Breed et al. | |
| 2006/0262140 A1 | 11/2006 | Kujawa et al. | |
| 2007/0087756 A1 | 4/2007 | Hoffberg | |
| 2007/0185644 A1 | 8/2007 | Hirose | |
| 2008/0046150 A1 | 2/2008 | Breed | |
| 2008/0318676 A1 | 12/2008 | Ham | |
| 2009/0005961 A1 | 1/2009 | Grabowski et al. | |
| 2009/0210257 A1 | 8/2009 | Chalfant et al. | |
| 2009/0268946 A1 | 10/2009 | Zhang et al. | |
| 2010/0192110 A1 | 7/2010 | Carter et al. | |
| 2010/0201894 A1 | 8/2010 | Nakayama et al. | |
| 2010/0253492 A1 | 10/2010 | Seder et al. | |
| 2010/0253493 A1 | 10/2010 | Seder et al. | |
| 2010/0253601 A1 | 10/2010 | Seder et al. | |
| 2010/0274480 A1 | 10/2010 | McCall et al. | |
| 2010/0292886 A1 | 11/2010 | Szczerba et al. | |
| 2010/0332266 A1 | 12/2010 | Tamir et al. | |
| 2011/0018903 A1 | 1/2011 | Lapstun et al. | |
| 2011/0022393 A1 | 1/2011 | Wäller et al. | |
| 2011/0052042 A1 | 3/2011 | Ben Tzvi | |
| 2011/0075257 A1 | 3/2011 | Hua et al. | |
| 2011/0093190 A1 | 4/2011 | Yoon | |
| 2011/0106428 A1 | 5/2011 | Park et al. | |
| 2011/0199376 A1 | 8/2011 | Salemann | |
| 2011/0251768 A1 | 10/2011 | Luo et al. | |
| 2012/0019557 A1 | 1/2012 | Aronsson et al. | |
| 2012/0041632 A1 | 2/2012 | Garcia Bordes | |
| 2012/0072105 A1 | 3/2012 | Feyereisen et al. | |
| 2012/0083964 A1 * | 4/2012 | Montemerlo | G05D 1/0214 701/26 |
| 2012/0154441 A1 | 6/2012 | Kim | |
| 2012/0162255 A1 | 6/2012 | Ganapathy et al. | |
| 2012/0173069 A1 | 7/2012 | Tsimhoni et al. | |
| 2012/0212405 A1 | 8/2012 | Newhouse et al. | |
| 2012/0224060 A1 | 9/2012 | Gurevich et al. | |
| 2012/0249589 A1 | 10/2012 | Gassner et al. | |
| 2012/0283942 A1 | 11/2012 | T'Siobbel et al. | |
| 2012/0310531 A1 | 12/2012 | Agarwal et al. | |
| 2013/0050258 A1 | 2/2013 | Liu et al. | |
| 2013/0083291 A1 | 4/2013 | Smithwick et al. | |
| 2013/0151145 A1 | 6/2013 | Ishikawa | |
| 2013/0261871 A1 | 10/2013 | Hobbs et al. | |
| 2013/0262997 A1 | 10/2013 | Markworth et al. | |
| 2014/0005857 A1 | 1/2014 | Heisterkamp | |
| 2014/0019913 A1 | 1/2014 | Newman et al. | |
| 2014/0036374 A1 | 2/2014 | Lescure et al. | |
| 2014/0063064 A1 | 3/2014 | Seo et al. | |
| 2014/0114845 A1 | 4/2014 | Rogers et al. | |
| 2014/0139524 A1 | 5/2014 | Nilsson et al. | |
| 2014/0267263 A1 | 9/2014 | Beckwith et al. | |
| 2014/0267398 A1 | 9/2014 | Beckwith et al. | |

FOREIGN PATENT DOCUMENTS

| | | |
|---|---|---|
| DE | 102006008981 | 8/2007 |
| DE | 102012210145 | 7/2009 |
| DE | 102008040467 | 1/2010 |
| DE | 102008042734 | 4/2010 |
| DE | 102009045169 | 3/2011 |
| DE | 102012221762 | 6/2013 |
| EP | 1862988 | 11/2009 |
| EP | 2618108 | 7/2013 |
| JP | 2006309552 | 11/2006 |
| WO | 2010040589 | 4/2010 |
| WO | WO2011108091 | 9/2011 |

OTHER PUBLICATIONS

Examination Report of DE Application No. 102014219575.6 dated Dec. 17, 2015, 10 pages.
Office Action of U.S. Appl. No. 14/041,614 dated Feb. 3, 2016, 45 pages.
Office Action of U.S. Appl. No. 14/460,478 dated Feb. 8, 2016, 70 pages.
Office Action of U.S. Appl. No. 14/463,618 dated Feb. 23, 2016, 58 pages.
Office Action of U.S. Appl. No. 14/465,049 dated Feb. 24, 2016, 31 pages.
Office Action of U.S. Appl. No. 13/832,209 dated Jan. 30, 2015, 26 pages.
Office Action of U.S. Appl. No. 13/832,918 dated Jan. 2, 2015.
MVS California, 2_Working_Demo.mov, YouTube, May 16, 2011, http://www.youtube.com/watch?v=pdtcyaF6bTl.
Autoblog, GM's Full-Windshield HUD Technology | Autoblog, YouTube, Mar. 17, 2010, http://www.youtube.com/watch?v=wR5EAGM4-U&feature=youtu.be&t=1m15s.
Office Action of U.S. Appl. No. 14/041,614 dated Dec. 23, 2014.
Article: Gray R. et al. "A Comparison of Different Informative Vibrotactile Forward Collision Warnings: Does the Warning Need to Be Linked to the Collision Event?", PloS One, 9(1), e87070, Jan. 27, 2014, http://www.plosone.org/article/info%3Adoi%2F10.1371%Fjournal.pone.0087070.
Article: Tai et al. "Bridging the Communication Gap: A Driver-Passenger Video Link" dated Apr. 15, 2010, https://www.pervasive.wiwi.uni-due.de/uploads/tx_itochairt3/publications/Bridging_the_Communication_Gap-MC2009-GraceTai_01.pdf.
Website: "Future Car Technologies" dated Dec. 19, 2013, http://www.carcoversdirect.com/car-lovers-resources/fact-friday/future-car-technologies/#.U3uVbPldVJ1.
Office Action of U.S. Appl. No. 13/041,614 dated May 6, 2015.

(56) References Cited

OTHER PUBLICATIONS

Website: "BMW Technology Guide: Adaptive Brake Assistant" http://www.bmw.com/com/en/insights/technology/technology_guide/articles/adaptive_brake_assistant.html, printed Oct. 17, 2014.
Website: "Adaptive Cruise Control and Collision Warning with Brake Support" http://corporate.ford.com/doc/Adaptive_Cruise.pdf, Jul. 2012.
Office Action of U.S. Appl. No. 13/832,918 issued May 8, 2015.
Office Action of U.S. Appl. No. 13/832,209 dated Jul. 16, 2015, 37 pages.
Office Action of U.S. Appl. No. 14/041,614 dated Aug. 6, 2015, 21 pages.
Office Action of U.S. Appl. No. 14/321,105 dated Sep. 24, 2015, 37 pages.
BMW Insights Source: http://www.bmw.com/com/en/insights/technology_guide/articles/adaptive_brake_assistan.html.
Adaptive Cruise Control and Forward Collision Warning Source: http://www.ford.com/cars/fusion/features/Feature13/#page=Feature13.
Forward Collision Warning Systems Using Heads-up Displays: Testing Usability of Two New Metaphors Alves, P.R., Goncalves, J., Rossetti, R.J., Oliveira, E.C., & Olaverri-Monreal, C. In Intelligent Vehicles Symposium Workshops (IV Workshops) IEEE (pp. 1-6) Jun. 2013.
Multisensory In-Car Warning Signals for Collision Avoidance HO, C., Reed, N., & Spence, C. Human Factors: The Journal of the Human Factors and Ergonomics Society, 49 (6), 1107-1114 2007.
Office Action of U.S. Appl. No. 14/465,049 dated Nov. 19, 2015, 63 pages.
Office Action of U.S. Appl. No. 14/321,105 dated Apr. 20, 2016, 37 pages.
Office Action of U.S. Appl. No. 14/460,478 dated Apr. 25, 2016, 18 pages.

* cited by examiner

SYSTEM AND METHOD FOR WARNING A DRIVER OF A POTENTIAL REAR END COLLISION

CROSS-REFERENCE TO RELATED APPLICATIONS

This application is a continuation-in-part of and claims priority to U.S. Patent Application entitled "INTERPRETATION OF AMBIGUOUS VEHICLE INSTRUCTIONS," having Ser. No. 14/465,049, filed Aug. 21, 2014 in the names of Victor Ng-Thow-Hing, Karlin Bark, and Cuong Tran; which is a continuation-in-part and claims priority to: U.S. Patent Application entitled "VOLUMETRIC HEADS-UP DISPLAY WITH DYNAMIC FOCAL PLANE," having Ser. No. 14/463,618, filed Aug. 19, 2014 in the names of Victor Ng-Thow-Hing, Tom Zamojdo, and Chris Grabowski; U.S. Patent Application entitled "VOLUMETRIC HEADS-UP DISPLAY WITH DYNAMIC FOCAL PLANE," having Ser. No. 14/460,478, filed Aug. 15, 2014 in the names of Victor Ng-Thow-Hing, Tom Zamojdo, and Chris Grabowski; and U.S. Patent Application entitled VOLUMETRIC HEADS-UP DISPLAY WITH DYNAMIC FOCAL PLANE," having Ser. No. 13/832,918, filed Mar. 15, 2013 in the names of Victor Ng-Thow-Hing, Tom Zamojdo, and Chris Grabowski. The entire disclosures of all of the above-mentioned related applications are hereby incorporated herein by reference.

TECHNICAL FIELD

The present application generally relates to a vehicle warning system, and, more particularly, to a system for informing a driver of a braking intensity of a vehicle located in front of the driver and showing alternative paths that the driver may take to avoid a rear end collision.

BACKGROUND

Motorized vehicles may be equipped with various kinds of warning systems. These warning systems may be general warning systems that inform the driver of different operating conditions of the vehicle. For example, vehicles may be equipped with warning systems which may be used to warn the driver of low fuel amounts, high and or low engine temperature, a drop in oil pressure, problems in charging a battery of the vehicle, and doors and or trunks that may be open.

Motorized vehicles may be equipped with more advanced warning systems which may be used to warn the driver of the vehicle about potentially dangerous situations involving other traffic participants. For example, warning systems have been designed for vehicles that may be used to provide a driver with back-up collision warning, blind spot detection, lane-departure warnings, as well as driver-alertness monitoring, assisted parking, traffic sign recognition, and proximity warnings.

While the above systems do provide the driver with warnings of potential dangers, these systems fail to provide information about a braking intensity level of a vehicle located in front of the driver (hereinafter lead vehicle) or information related to paths that the driver may take in order to avoid a potential rear end collision. Presently, most vehicles have tail lights as well as a third brake light generally located in an upper or lower central area of a rear window of the vehicle. When a driver presses on a brake pedal of the vehicle, the tail lights and third brake light may illuminate in order to warn other vehicles that that the driver is braking. Unfortunately, the tail lights and third brake light may illuminate the same intensity no matter how hard or how lightly the driver is stepping on the brake pedal. Further, the tail lights and third brake light generally do not provide information related to paths that the driver may take to avoid a potential rear end collision.

Other systems, such as proximity warning systems may alert a driver that he is following a lead vehicle too closely. However, these systems generally do not provide information as to a braking intensity of the lead vehicle or provide information related to paths that the driver may take to avoid a potential rear end collision. It would thus be desirable to provide a vehicle warning system that provides information as to braking intensity and/or provides information related to paths that the driver may take to avoid a rear end collision.

SUMMARY

In accordance with one embodiment, a system for indicating braking intensity to a main vehicle has an observational device monitoring positional and speed data of at least one vehicle proximate the main vehicle is provided. A control unit is coupled to the observational device. The control unit processes the positional and speed data monitored by the observational device and generates graphical representations of the at least one vehicle proximate the main vehicle and graphical representations of a braking intensity level of the at least one vehicle proximate the main vehicle.

In accordance with one embodiment, a system for indicating braking intensity to a main vehicle has an observational device monitoring positional and speed data of a plurality of vehicles proximate the main vehicle is provided. A control unit is coupled to the observational device. The control unit processes the positional and speed data monitored by the observational device and generates graphical representations of at least one vehicle of the plurality of vehicles, the at least one vehicle located in front of a driver of the main vehicle, graphical representations of a braking intensity level of a lead vehicle of the plurality of vehicles, the lead vehicle located directly in front of the main vehicle and in a same traffic lane, and graphical representations of an alternate pathway for the main vehicle preventing a possible collision with the lead vehicle. A display is coupled to the control unit. The display shows the graphical representations of the at least one vehicle of the plurality of vehicles located in front of a driver of the main vehicle, graphical representations of the braking intensity level of the lead vehicle of the plurality of vehicles, and graphical representations of an alternate pathway for the main vehicle preventing a possible collision with the lead vehicle.

In accordance with one embodiment, a system for indicating braking intensity to a main vehicle has an observational device monitoring positional and speed data of a plurality of vehicles proximate the main vehicle is provided. A control unit is coupled to the observational device. The control unit processes the positional and speed data monitored by the observational device and generates graphical representations of a first set of vehicles of the plurality of vehicles proximate the main vehicle, the first set of vehicles located in front of a driver of the main vehicle, graphical representations of a braking intensity level of a lead vehicle of the first set of vehicles, the lead vehicle located directly in front of the main vehicle, wherein the graphical representations indicating the braking intensity of the lead vehicle comprises an indicator, wherein one of a length of the indicator depicts the braking intensity level or a color of the indicator varies to depict the braking intensity level, and graphical representations of an alternate pathway for the main vehicle preventing a possible collision with the lead vehicle, wherein the graphical representations of the alternate pathway comprises a lane indicator, wherein the lane indicator depicts which traffic lane adjacent to the main vehicle is clear for the main vehicle to enter.

BRIEF DESCRIPTION OF DRAWINGS

Embodiments of the disclosure will become more fully understood from the detailed description and the accompanying drawings, wherein.

DESCRIPTION OF THE APPLICATION

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

Figure 1:
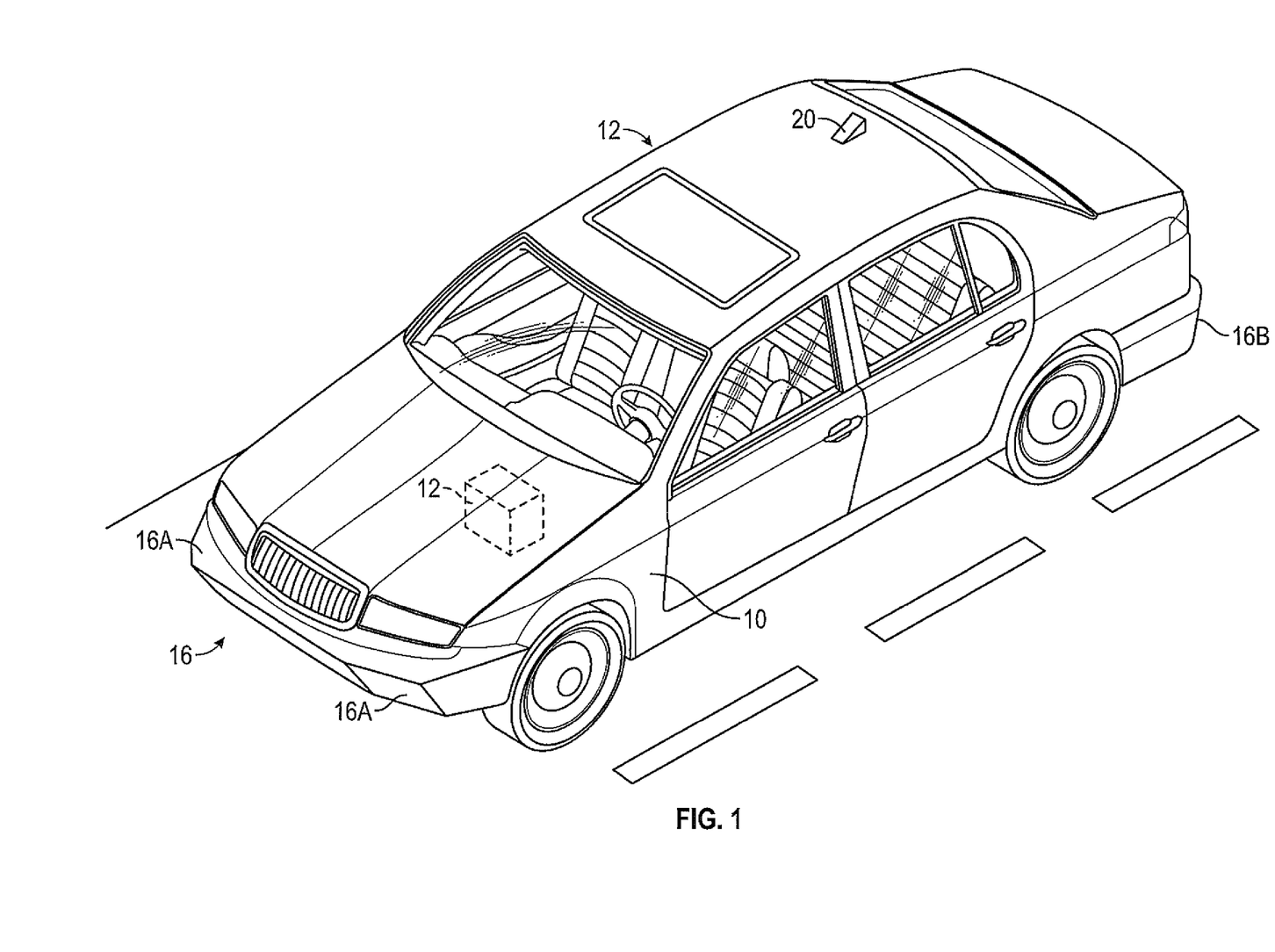
FIG. 1 is an elevated perspective view of a vehicle implementing an exemplary warning system that may be used to inform a driver of a braking intensity level of a lead vehicle and information related to alternative paths that a driver may take to avoid a potential rear end collision in accordance with an aspect of the present application.

Referring to FIG. 1, an exemplary vehicle 10 is shown. The vehicle 10 may be one that is operated entirely by the driver. In an alternative embodiment, the vehicle 10 may be an autonomous vehicle that, at least some of the time, uses a computerized system to control the motion of the vehicle 10 according to certain voice commands given by a human passenger. The vehicle 10 may be equipped with a warning system 12. The warning system 12 may be used to enhance a driver's awareness of a braking intensity of one or more vehicles located in front of the vehicle 10. The vehicle located directly in front of the vehicle 10 may be labeled as a lead vehicle. In accordance with one embodiment, the lead vehicle may be positioned directly in front of the vehicle 10 and within the same traffic lane as the vehicle 10. The warning system 12 may be configured to display and/or project an indicator that communicates, to the driver/passenger, information regarding the braking intensity of the lead vehicle. Additional indicators may be shown which may communicate, to the driver/passenger, information regarding the braking intensity of other vehicles located proximate the vehicle 10. For example, the indicator may communicate the braking intensity of other vehicles located in front of the vehicle 10 but not in the same lane as the vehicle 10. The indicator of the warning system 12 may also communicate, to the driver/passenger, alternative paths that the vehicle 10 may take to avoid a rear end collision with the lead vehicle or any other surrounding vehicles as will be described below.

Figure 2:
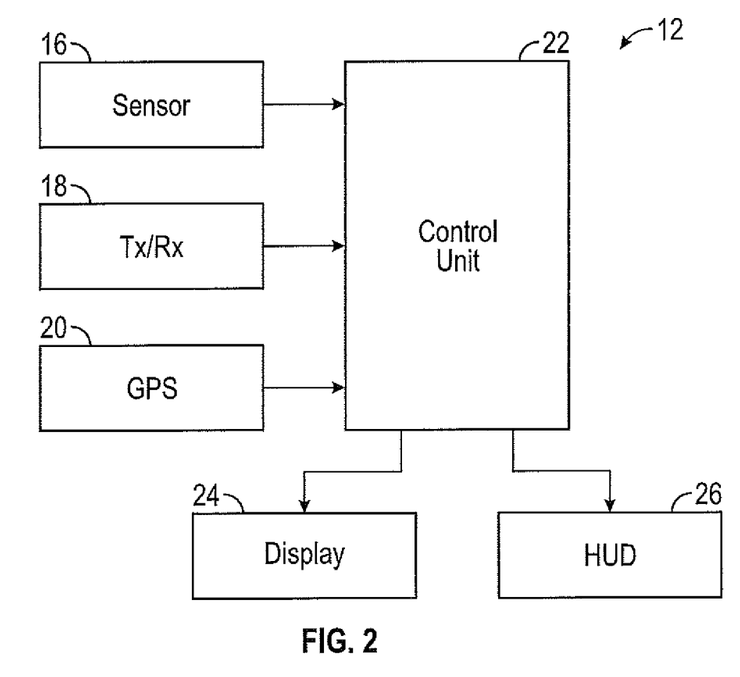
FIG. 2 is a block diagram of the exemplary warning system depicted in FIG. 1 in accordance with an aspect of the present application.

Referring now to FIGS. 1 and 2, the warning system 12 may have a plurality of sensors 16. The sensors 16 may be positioned around a perimeter area of the vehicle 10. In the embodiment shown in FIG. 1, the sensors 16 may be configured to be mounted within the body of the vehicle 10 such as in a front and/or rear bumper of the vehicle 10. However, this is only shown as an example and should not be seen in a limiting manner. The sensors 16 may be located in other areas of the vehicle 10 and may be mounted in other parts of the vehicle 10.

A first set of sensors 16A may be located in a front area of the vehicle 10. The first set of sensors 16A may be used to capture data of one or more vehicles located in front of the vehicle 10. The sensors 16A may capture data regarding the position of one or more vehicles located in front of the vehicle 10 and data regarding the deceleration and/or braking activity of the one or more vehicles in front of the vehicle 10. The sensors 16A may be cameras, image sensing devices, radar or similar type devices. The above-mentioned types of sensors 16A are given as an example and should not be seen in a limiting manner.

The warning system 12 may have a second set of sensors 16B. In the embodiment shown in FIG. 1, the second set of sensors 16B may be positioned towards a rear area of the vehicle 10. However, this is shown as an example and the second set of sensors 16B may be positioned in other areas of the vehicle 10. The second set of sensors 16B may be used to capture data regarding the position of one or more vehicles located proximate the vehicle 10. In addition to capturing positional data, the sensors 16B may capture deceleration and/or braking activity of the vehicles positioned around the vehicle 10 as well. The positional data or the positional and speed data captured by the second set of sensors 16B may be used to determine if the vehicle 10 may change lanes when driving in order to avoid a rear end collision.

In accordance with one embodiment, the sensors 16B may be part of an existing vehicle system. For example, the sensors 16B may be part of a Blind Spot Information (BSI) system of the vehicle 10. In this embodiment, the sensors 16B may be adjusted to monitor a wider field of view.

The sensors 16B may be cameras, image sensing devices, radar or similar type devices. The above-mentioned types of sensors 16B are given as an example and should not be seen in a limiting manner.

Alternatively, instead of using sensors 16A and/or 16B or in addition to the sensors 16A and/or 16B, the vehicle 10 may obtain data related to the one or more vehicles located around the vehicle 10 through the use of vehicle-to-vehicle (V2V) communications. V2V communications may allow dynamic wireless exchange of data between nearby vehicles. Thus, vehicle related data such as location, speed, and other data may be transmitted from the one or more vehicles located around the vehicle 10 to the warning system 12. By monitoring the speed of the one or more vehicles located around the vehicle 10, the system 12 may determine how fast or slowly these vehicles are decelerating, and thereby determine the braking intensity of these vehicles.

If the warning system 12 uses V2V communications, the warning system 12 may have a transmitter/receiver unit 18. The transmitter/receiver unit 18 may be used to receive vehicle related data such as location and speed from the one or more vehicles located around the vehicle 10, as well as transmit vehicle related data such as location and speed of the vehicle 10 to other vehicles located around the vehicle 10.

The warning system 12 may have a Global Positioning Satellite (GPS) unit 20. The GPS unit 20 may be used to determine the location and speed of the vehicle 10. This data may be transmitted through the transmitter/receiver unit 18 to vehicles located around the vehicle 10.

The sensors 16A and 16B may be coupled to a control unit 22. The control unit 22 may take and process the data captured by the sensors 16A and 16B. The control unit 22 may process the data in order to detect and identify the position of the one or more vehicles located around the vehicle 10 as well as the speed of the one or more vehicles located around the vehicle 10. By monitoring how fast or how slowly the one or more vehicles located around the vehicle 10 decelerate, the control unit 22 may determine a braking intensity for the one or more vehicles located in front of the vehicle 10. For example, the faster a vehicle decelerates, the harder the braking intensity for that vehicle. If the vehicle is slowly decelerating, then the barking intensity for that vehicle would be lighter.

Alternatively, if the warning system 12 uses V2V communications, the transmitter/receiver 18 may be coupled to the control unit 22. The control unit 22 may take and process the vehicle related data such as location and speed from the lead vehicle, as well as other vehicles proximate the vehicle 10, received from the transmitter/receiver 18. The control unit 22 may process the data in order to detect and identify the lead vehicle and the other surrounding vehicles. The control unit 22 may identify the position of the lead vehicle and surrounding vehicles as well as the speed of the lead vehicle and surrounding vehicles. By monitoring how fast or how slow the lead vehicle and the other surrounding vehicles are, the control unit 22 may determine a braking intensity for the lead vehicle and surrounding vehicles. For example, the faster a vehicle decelerates, the harder the braking intensity for that vehicle. If the vehicle is slowly decelerating, then the barking intensity for that vehicle would be lighter.

The control unit 22 may take and process the data received from the sensors 16A and 16B and/or the data received through the transmitter/receiver 18 via the V2V communications and generate graphical representations of the lead vehicle and a braking intensity of the lead vehicle if the lead vehicle is decelerating. The control unit 22 may take and process the data and generate graphical representations of other vehicles located in front of the vehicle 10 and a braking intensity of these other vehicles located in front of the vehicle 10 if the vehicles located in front of the vehicle 10 are decelerating. The control unit 22 may generate graphical representations of alternative paths that the vehicle 10 may take, if any, to avoid a potential rear end collision with the lead vehicle 14 or any other vehicles proximate the vehicle 10.

The warning system 12 is a dynamic system. The control unit 22 may continuously update graphical representations of the different vehicles and the braking intensities captured by the sensors 16A and 16B and/or received through the transmitter/receiver 18 via the V2V communications. Thus, for example, as the vehicle 10 is in motion and as the lead vehicle brakes, accelerates, and changes position in relation to the vehicle 10, the graphical representations of the lead vehicle and the braking intensity of the lead vehicle may be continuously updated. Graphical representations indicating alternative paths that the vehicle 10 may take to avoid a potential rear end collision with the lead vehicle or any other surrounding vehicles may also be continuously updated as the lead vehicle and any other surrounding vehicles change position in relation to the vehicle 10.

The control unit 22 may be coupled to a display 24. The display 24 may be used to show the graphical representations generated by the control unit 22. Thus, the display 24 may show graphical representations of the lead vehicle and other surrounding vehicles captured by the sensors 16A and 16B and/or received through the transmitter/receiver 18 via the V2V communications. The display 24 may show graphical representations of the braking intensity of the lead vehicle and or other vehicles as well as graphical representations indicating alternative paths that the vehicle 10 may take to avoid a potential rear end collision with the lead vehicle or any other surrounding vehicles. Alternatively, the control unit 22 may be coupled to a Heads-Up Display (HUD) system 26. The HUD system 26 may be used to display the above mentioned graphical representations generated by the control unit 22.

The warning system 12 may be configured so that the display 24 and/or HUD system 26 displays the general area viewable in front of the driver when the driver is seated in the vehicle 10 (hereinafter Field of View (FOV) of the driver). However, for other surrounding vehicles detected by the sensors 16B but not in the FOV of the driver or towards a far edge of the FOV, for example a vehicle located behind or to the side of the vehicle 10, symbols and or warning text and a string indicating a general position of the surrounding vehicle may be generated and shown on the display 24 and or HUD system 26.

Figure 3:
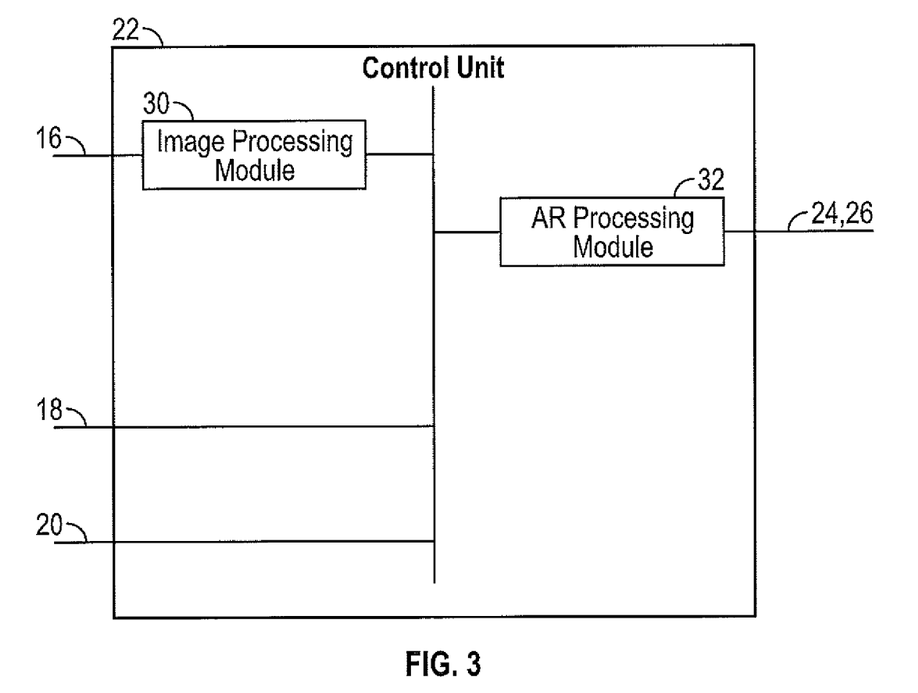
FIG. 3 is an exemplary illustrative control unit of the warning system shown in FIG. 2 in accordance with an aspect of the present application.

Referring now to FIG. 3, a block diagram of the control unit 22 may be seen. The control unit 22 may have an image processing module 30. The image processing module 30 may be coupled to the sensors 16A, 16B. The image processing module 30 may process the data from the sensors 16A, 16B in order to identify the lead vehicle and surrounding vehicles detected by the sensors 16A, 16B. In accordance with one embodiment, the image processing module 30 may be able to identify and distinguish the lead vehicle that is directly in front of and within the same traffic lane as the vehicle 10 from other vehicles that are ahead of the vehicle 10 but that are in a different lane than the vehicle 10. The image processing module 30 may be able to identify vehicles surrounding the vehicle 10 and whether the vehicle 10 may be able to switch lanes to avoid a possible collision with the lead vehicle or other vehicle located in front of the vehicle 10.

The image processing module 30 may be used to monitor the speed of the lead vehicle and other vehicles that are ahead of the vehicle 10 but that are in a different lane than the vehicle 10. By monitoring the speed and seeing if there is a decelerating in speed, the image processing module 30 may calculate a rate of deceleration or a braking intensity of the lead vehicle or other vehicles located in front of the vehicle 10.

An Augmented Reality (AR) processing module 32 of the control unit 22 may be used to generate graphical representations of the lead vehicle and vehicles located in front of the vehicle 10, graphical representations of a braking intensity of the lead vehicle when the lead vehicle is braking, and graphical representations indicating the alternative paths that the vehicle 10 may take to avoid a rear end collision with the lead vehicle or any other surrounding vehicles. In accordance with one embodiment, the Augmented Reality (AR) processing module 32 may be used to generate graphical representations of the lead vehicle and vehicles located in front of the vehicle 10, graphical representations of a braking intensity of the lead vehicle and other vehicles located in front of the vehicle 10 when one or more of these vehicles are braking, and graphical representations indicating the alternative paths that the vehicle 10 may take to avoid a rear end collision with the lead vehicle or any other surrounding vehicles.

The AR processing module 34 may generate the above graphical representations based on the date processed by the image processing module 30. If the system 12 is using V2V communications, the data received from the transmitter/receiver 18 may be used either alone or in combination with the date processed by the image processing module 30 to generate the above graphical representations. The graphical representations generated by the AR processing module 32 may be two dimensional representations or three dimensional representations. The graphical representations generated by the AR processing module 32 may be shown on the HUD system 26 or, alternatively, on a display 24 located within the vehicle 10.

Figure 4:
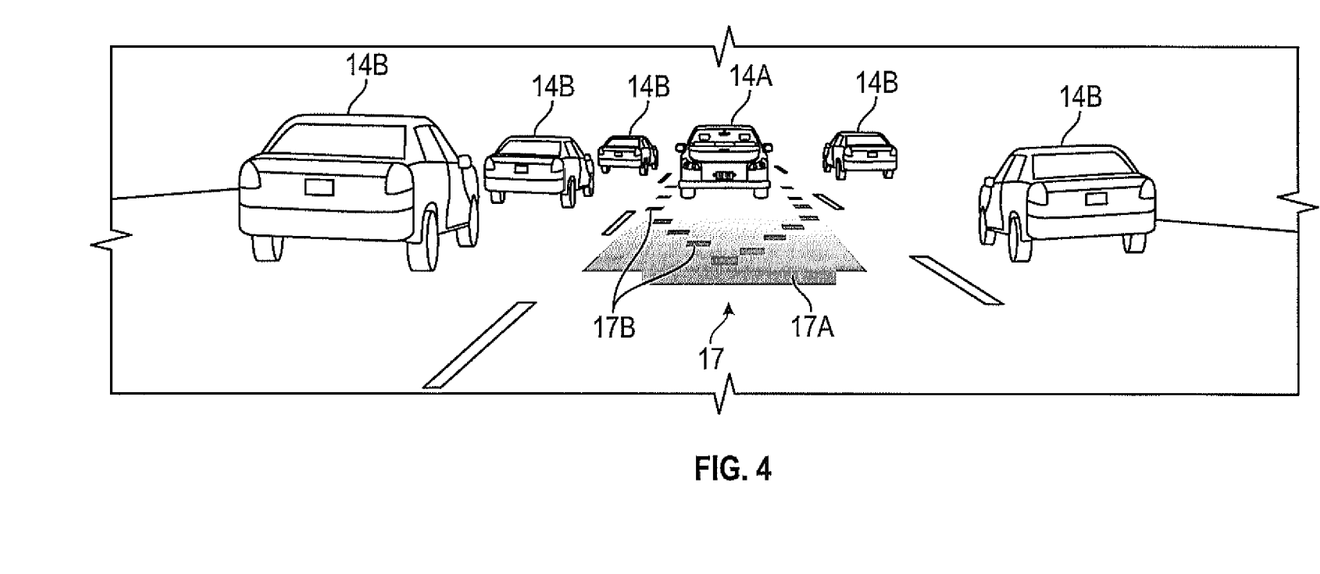
FIG. 4 shows one embodiment of an exemplary Augmented Reality (AR) visual generated by the warning system of FIG. 1 in accordance with an aspect of the present application.

Referring now to FIG. 4, an exemplary embodiment of an augmented reality generated and displayed by the warning system 12 may be seen. The augmented reality shown may be the FOV in front of the driver when the driver is seated in the vehicle 10. The exemplary embodiment may illustrate when a lead vehicle 14A is braking. The AR may allow multiple focal points allowing the projected graphical representation to move towards and away from the driver's FOV.

The control unit 22 may generate one or more graphical representations illustrating a braking intensity of the lead vehicle 14A monitored by the sensors 16A and or through the V2V communications. In the present embodiment, the lead vehicle 14A and five surrounding vehicles 14B may be seen as being in the FOV of the driver. To communicate to the driver that the lead vehicle 14A is braking, an indicator 17 may appear behind and/or partially around the lead vehicle 14A. In the embodiment shown in FIG. 4, the indicator 17 may include a bar 17A, a plurality of dashed bars 17B outlining a geometric shape, or other similar markings (referred to generically as indicator 17). The indicator 17 may include just the bar 17A, just the plurality of dashed bars 17B or a combination of the bar 17A and plurality of dashed bars 17B to indicate whether the lead vehicle 14 is braking and the intensity with which the lead vehicle 14 is braking. The indicator 17 may be colored (e.g. red) so as to draw the driver's attention to the indicator 17 and of a potential collision. The indicator 17 may flash and/or blink to further draw the driver's attention to the indicator 17.

In accordance with one embodiment, the shape and/or color of the indicator 17 may vary based on the intensity with which the lead vehicle 14 is braking. For example, a length of the bar 17A, or length of the geometric shaped formed by the plurality of dashed bars 17B may indicate the braking intensity. The longer the length of the bar 17A, or length of the geometric shaped formed by the plurality of dashed bars 17B, the harder braking intensity of the lead vehicle 14A. Alternatively, or in addition to the above, the color of the bar 17A, or the plurality of dashed bars 17B may indicate the braking intensity. For example, the darker the color of the bar 17A or dashed bars 17B, the harder braking intensity of the lead vehicle 14A.

As shown in FIG. 4, the bar 17A appears long and appears solid in color initially and then gradually becomes lighter in color. This may communicate to the driver that the lead vehicle 14 braked hard initially (dark solid portion of the bar 17A), began to ease up on the brake (slightly transparent portion of the bar 17A), and then let go of the brake (completely transparent portion of the bar 17A).

Figure 5:
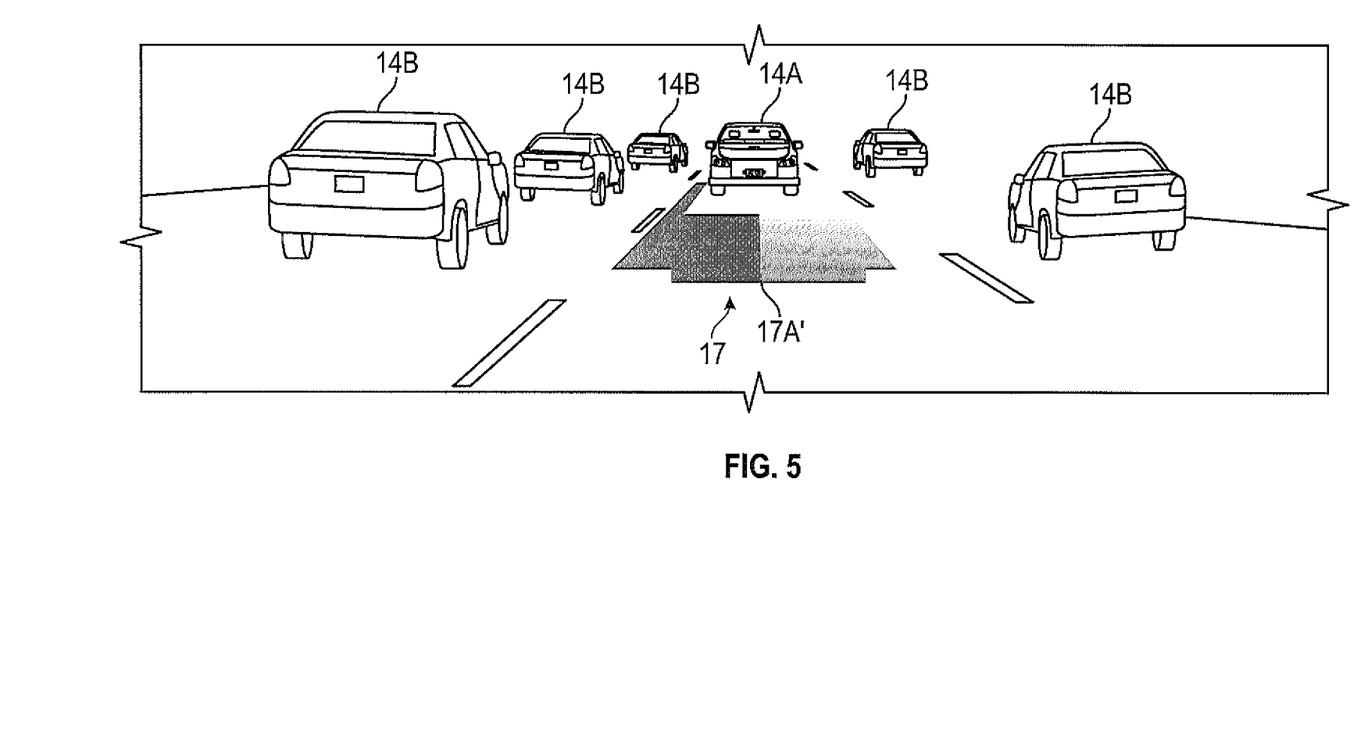
FIG. 5 is another embodiment showing an exemplary AR visual generated by the warning system of FIG. 1 in accordance with an aspect of the present application.

The projections 17 may indicate to the driver whether an alternative path exists for the driver to safely swerve into in order to avoid a potential rear end collision with the lead vehicle 14. As shown in FIG. 5, the bar 17A' may be seen as being long and solid in color which may communicate to the driver that the lead vehicle 14 is braking hard and is continuing to brake hard. A right side portion of the bar 17A' may be seen as being lighter and/or more transparent in color than a left side portion of the bar 17A'. This may communicate to the driver that the right side of the road may be clear if the driver needs to swerve to avoid a potential rear end collision with the lead vehicle 14A and that the left side of the road may be obstructed by another vehicle or object.

Figure 6:
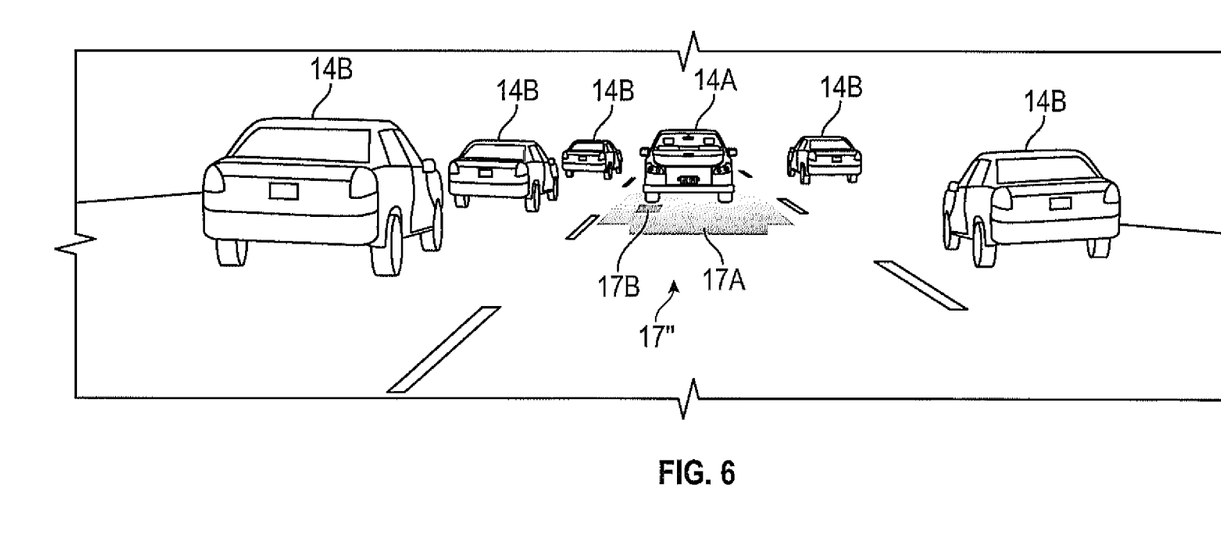
FIG. 6 is another embodiment showing an exemplary AR visual generated by the warning system of FIG. 1 in accordance with an aspect of the present application.

Referring now to FIG. 6, another embodiment may be seen as to how the projections 17 may indicate to the driver whether an alternative path exists for the driver to safely swerve into in order to avoid a potential rear end collision with the lead vehicle 14. In FIG. 6, the bar 17A" may be seen as being more transparent in color and shorter in comparison to the bar 17A of FIG. 4 and the bar 17A' of FIG. 5. The bar 17A" is slightly transparent, which may indicate to the driver that the lead vehicle 14 is braking normally. A projection 17B" may be shown near the left side portion of the bar 17A", which may communicate to the driver that the right side of the road is clear if the driver needs to swerve to avoid a rear end collision with the lead vehicle 14 and that the left side of the road is obstructed by another vehicle or object.

The above embodiment are shown as examples of how the color intensity of the indicator 17 (solid versus transparent and gradations in between) and shape (long versus short and gradations in between) may vary according to the intensity with which the lead vehicle 14 is braking and may also vary according to which alternate path may be available, if any, for the vehicle 10 to swerve into in order to avoid a potential rear end collision with the lead vehicle 14. In alternative embodiments, different colors may be used to indicate braking intensity. For example, the indicator 17 may appear green if the lead vehicle 14 is braking normally, yellow if the lead vehicle 14 is braking harder but poses no threat to the vehicle 10, and appear red if the lead vehicle 14 is braking hard and poses a threat to the vehicle 10. As another example, the color green could be used to indicate a safe alternate path that the vehicle 10 may take to avoid a rear end collision with the lead vehicle 14 and the color red could be used to indicate that an alternate path is blocked and cannot be used by the vehicle 10 to avoid the collision. In other embodiments, the light pattern of the bar 17A may vary depending upon the intensity with which the lead vehicle 14 is braking.

While embodiments of the disclosure have been described in terms of various specific embodiments, those skilled in the art will recognize that the embodiments of the disclosure may be practiced with modifications within the spirit and scope of the claims.

What is claimed is:

1. A system for indicating braking intensity to a main vehicle comprising:
   an observational device monitoring positional and speed data of a plurality of vehicles proximate the main vehicle;
   a control unit coupled to the observational device processing the positional and speed data monitored by the observational device and generating graphical representations of at least one vehicle of the plurality of vehicles, the at least one vehicle located in front of a driver of the main vehicle, graphical representations of a braking intensity level of a lead vehicle of the plurality of vehicles, the lead vehicle located directly in front of the main vehicle and in a same traffic lane, and graphical representations of an alternate pathway for the main vehicle preventing a possible collision with the lead vehicle; and
   a display coupled to the control unit showing the graphical representations of the at least one vehicle of the plurality of vehicles located in front of a driver of the main vehicle, graphical representations of the braking intensity level of the lead vehicle of the plurality of vehicles, and graphical representations of an alternate pathway for the main vehicle preventing a possible collision with the lead vehicle.

2. The system of claim 1, wherein the graphical representations indicating the braking intensity of the lead vehicle comprises an indicator, wherein a length of the indicator depicts the braking intensity level.

3. The system of claim 1, wherein the graphical representations indicating the braking intensity of the lead vehicle comprises an indicator, wherein a color of the indicator varies illustrating the braking intensity level.

4. The system of claim 1, wherein the graphical representations of the alternate pathway comprises a lane indicator, wherein the lane indicator depicts which traffic lane adjacent to the main vehicle is clear for the main vehicle to enter.

5. The system of claim 4, wherein the lane indicator is positioned on a side of the traffic lane adjacent to the main vehicle that is unsafe to enter.

6. The system of claim 1, wherein the observational device comprises a plurality of monitoring sensors coupled to the main vehicle and the control unit monitoring at least one of position or speed of the plurality of vehicles proximate the main vehicle.

7. The system of claim 1, wherein the observational device comprises a vehicle to vehicle (V2V) communication system wirelessly communicating speed and positional data between the main vehicle and the plurality of vehicles proximate the main vehicle.

8. A system for indicating braking intensity to a main vehicle comprising:

an observational device monitoring positional and speed data of a plurality of vehicles proximate the main vehicle;

a control unit coupled to the observational device processing the positional and speed data monitored by the observational device and generating graphical representations of a first set of vehicles of the plurality of vehicles proximate the main vehicle, the first set of vehicles located in front of a driver of the main vehicle, graphical representations of a braking intensity level of a lead vehicle of the first set of vehicles, the lead vehicle located directly in front of the main vehicle, wherein the graphical representations indicating the braking intensity of the lead vehicle comprises an indicator, wherein one of a length of the indicator depicts the braking intensity level or a color of the indicator varies to depict the braking intensity level, and graphical representations of an alternate pathway for the main vehicle preventing a possible collision with the lead vehicle, wherein the graphical representations of the alternate pathway comprises a lane indicator, wherein the lane indicator depicts which traffic lane adjacent to the main vehicle is clear for the main vehicle to enter.

9. The system of claim 8, wherein the observational device comprises a plurality of monitoring sensors coupled to the main vehicle and the control unit monitoring at least one of position or speed of the plurality of vehicles proximate the main vehicle.

10. The system of claim 8, wherein the observational device comprises a vehicle to vehicle (V2V) communication system wirelessly communicating speed and positional data between the main vehicle and the plurality of vehicles proximate the main vehicle.

* * * * *